United States Patent

[11] 3,614,133

| [72] | Inventors | Edward Ganci<br>3243 Magnolia Ave., Long Beach, Calif. 90806;<br>Joseph V. Gance, 4823 Carfax Ave., Lakewood, Calif. 90713; Gerald H. Anderson, 3056 Chestnut St., Long Beach, Calif. 90806 |
|---|---|---|
| [21] | Appl. No. | 11,063 |
| [22] | Filed | Feb. 13, 1970 |
| [45] | Patented | Oct. 19, 1971 |

[54] SHOPPING CART
4 Claims, 7 Drawing Figs.

[52] U.S. Cl. ................................................ 280/33.99 R
[51] Int. Cl. ................................................ B62b 11/00
[50] Field of Search ....................................... 280/33.29; 186/1 AC

[56] References Cited
UNITED STATES PATENTS

| 2,479,530 | 8/1949 | Watson | 280/33.99 F |
|---|---|---|---|
| 2,556,532 | 6/1951 | Goldman | 280/33.99 F |
| 2,898,123 | 8/1959 | Davis et al. | 280/33.99 |
| 3,112,934 | 12/1963 | Buczak | 280/33.99 |
| 3,219,148 | 11/1965 | Stern, Jr. et al. | 186/1 AC |

FOREIGN PATENTS

| 6,500,977 | 7/1966 | Netherlands | 280/33.99 |

*Primary Examiner*—Benjamin Hersh
*Assistant Examiner*—Milton L. Smith
*Attorney*—William C. Babcock ABSTRACT: A substantially horizontal goods or grocery support and two laterally spaced vertical side pieces that are preformed as integral units from a rigid plastic material, and are removably held together by a plurality of spacing elements to form the major portion of a shopping cart assembly.

The shopping cart assembly further includes end and sidewalls removably secured to said support and side pieces and cooperate therewith to define an enclosure in which merchandise such as groceries or the like may be disposed. Casters are mounted on the lower portions of said side pieces to permit said cart to be rolled over a floor surface.

The market cart is capable of being shipped in a compact, knockeddown condition and the components easily assembled into a cart configuration by the use of conventional, readily available hand tools. In the event any one of the cart components is damaged, the damaged component is easily removed from the car assembly and replaced by a new or undamaged component, all in a minimum of time.

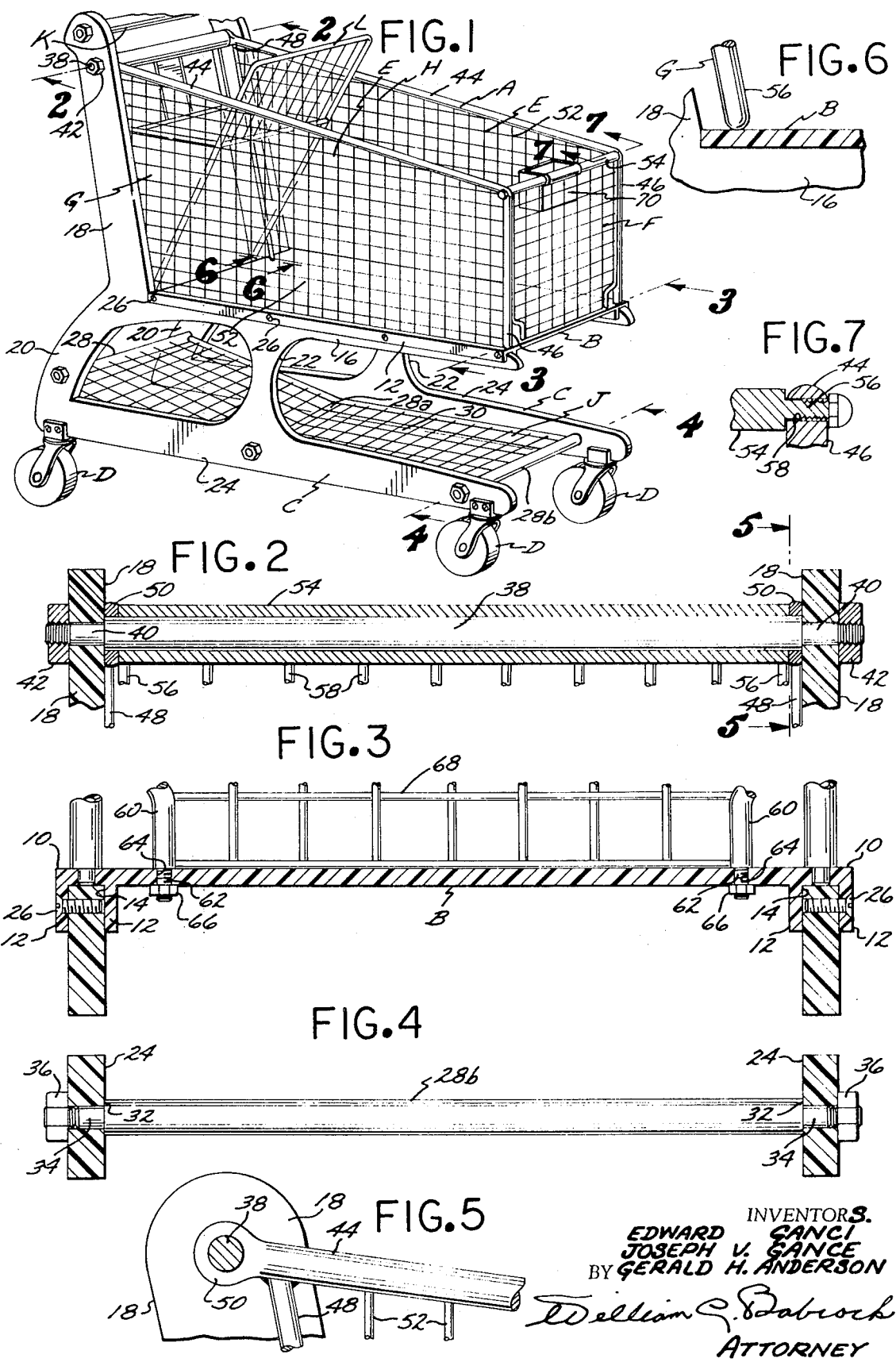

SHOPPING CART

BACKGROUND OF THE INVENTION

1. Field of the Invention

Shopping cart.

2. Description of the Prior Art

In super markets, and the like, it is customary to provide shopping carts that are moved from place to place by patrons. Such carts are of heavy tubular and wire mesh structure, with the components being welded together. The carts of this structure are heavy and difficult to push from place to place, particularly by women patrons. Carts of the above description are subjected to rough handling and as a result are frequently damaged. After a cart has been damaged, it is frequently out of service for a prolonged period of time due to the difficulty of making adequate repairs thereto. Carts of the above description are expensive to ship, due to both bulk and weight.

The primary purpose in devising the present invention is to supply a shopping cart that will overcome the operational disadvantages of prior art devices of this nature.

SUMMARY OF THE INVENTION

A shopping cart in which the major components thereof are formed as integral units from a rigid plastic material, and are removably held together in a cart defining configuration. The resulting cart is relatively light in weight, and may be shipped in a knockeddown configuration. The components defining the cart are easily assembled by the use of conventional hand tools. Also, in the event a component of a cart assembly is damaged, it may be easily separated from the assembly and replaced by a new or undamaged component.

A major object of the present invention is to supply a market cart of simple design and in which the major components thereof are preformed as integral units from a rigid plastic material, is relatively light in weight, and one that may be shipped in a dismantled condition to conserve space.

Another object of the invention is to furnish a market cart in which any one of the components may be separated from the balance thereof by the use of readily available hand tools, and the component so removed if damaged replaced by a new component.

A further object of the invention is to provide a shopping cart that may be easily and quickly repaired without welding or brazing to minimize the time a damaged cart is out of service.

BRIEF DESCRIPTION OF THE DRAWING

FIG. 1 is a perspective view of the shopping cart;

FIG. 2 is a transverse cross-sectional view of the device taken on the line 2—2 of FIG. 1;

FIG. 3 is a transverse cross-sectional view of the device taken on the line 3—3 of FIG. 1;

FIG. 4 is a transverse cross-sectional view of the device taken on the line 4—4 of FIG. 1;

FIG. 5 is a fragmentary longitudinal cross-sectional view of the device taken on the line 5—5 of FIG. 2;

FIG. 6 is a fragmentary longitudinal cross-sectional view of the device taken on the line 6—6 of FIG. 1; and FIG. 7 is a fragmentary transverse cross-sectional view of the device taken on the line 7—7 of FIG. 1.

DESCRIPTION OF THE PREFERRED EMBODIMENT

The shopping cart A as may be seen in FIG. 1 includes a forwardly and upwardly extending, elongate, trapezoidal, primary support B on which merchandise (not shown) such as groceries may be placed. The primary support B is removably secured to two identical laterally spaced side pieces C. Both the supports B and side pieces C are preformed as individual units from a hard polymerized resin such as one of the commercially available resins. Side pieces C have casters D secured to the lower end portions thereof to permit the cart A to be rolled from place to place in a store or market.

Two sidewalls E, a forward wall F, and gate G are disposed above primary support B and cooperate therewith to define an enclosure H in which merchandise (not shown) may be placed to rest on primary support B. A secondary support J for merchandise (not shown) is provided on the shopping cart A, and is situated below the primary support B. The shopping cart A includes a transverse handle K that extends between the rearward upper extremities of the side pieces C as shown in FIG. 1 to permit the cart A to be pushed from place to place.

Primary support B has two side edges 10 from which two sets of spaced parallel flanges 12 extend downwardly. Each set of flanges 12 defines a longitudinally extending space 14 therebetween. Each of the side pieces C includes an elongate forwardly and slightly upwardly extending first arm 16. First arm 16 at the rearward end thereof develops into an upwardly and rearwardly extending member 18, and a downwardly projecting first member 20.

A second member 22 projects downwardly from first arm 16 and is situated forwardly from the first member 20 a substantial distance. Each side piece C also includes a longitudinally extending second arm 24 that is spaced below the first arm 16, with the second arm being connected to the lower end portions of first and second members 20 and 22 respectively. Second arms 24 have casters D secured to the end portions thereof as shown in FIG. 1.

The upper portions of first arms 16 snugly and removably engage spaces 14 and are held therein by screws 26. The screws 26 extend through openings (not shown) in the outermost flanges 12 to engage first arms 16 as best seen in FIG. 3.

First, second and third rigid spacer rods 28, 28a and 28b are transversely positioned between second arms 24 as shown in FIG. 1, and support a longitudinally extending strip of wire or plastic mesh 30. Each of the rods 28, 28a and 28b has shoulders 32 formed on the end portions thereof that abut against the interior surfaces of second arms 24. Threaded rod portions 34 project outwardly from shoulders 32, and extend through openings (not shown) formed in second arms 24. The threaded rod portions 34 are engaged by nuts 36.

A horizontal rod 38 having shouldered, threaded end portions 40 extends between members 18 as may best be seen in FIGS. 1 and 2, and is removably held in engagement with the members by nuts 42. Each of the side pieces C includes a forwardly and downwardly extending upper rod 44, forward vertical rod 46, lower horizontal rod 47, and upwardly extending rear rod 48. Rod 44 on the rearward end is formed with an eye 50 that removably engages rod 38 as best seen in FIG. 2. Wire or plastic mesh 52 extends between rods 44, 46, 47, and 48 and cooperates therewith to provide one of the side pieces C.

Gate G as may best be seen in FIGS. 1, 2 and 6 includes a tube 54 pivotally supported on rod 38 between eyes 50, with the tube having a U-shaped frame 56 depending therefrom that supports a panel of wire or plastic mesh 58. Frame 56 is of such length as to contact primary support B when the gate G is in its normal position as shown in FIGS. 1 and 2. The primary support B acts as a stop to prevent the gate G swinging rearwardly beyond the position illustrated in FIG. 6. A child support L of conventional design may be mounted on the gate G if desired.

Forward wall F includes a horizontal crossbar 54 that has shouldered threaded end portions 56 that project through transverse bores 58 formed at the intersection of the rods 44 and 46 as illustrated in detail in FIG. 7. Two vertical, laterally spaced rods 60 depend from crossbar 54. Rods 60 have lower threaded end portions 62 that extend downwardly through vertical bores 64 formed in primary support B. The lower extremities of end portions 62 are engaged by nuts 66. Crossbar 54 and rods 60 support a panel 68 of wire or plastic mesh therebetween as shown in FIG. 1. A receptacle 70 for small items may be mounted on the upper portion of forward wall F if desired.

The use and operation of cart A has been described previously in detail and need not be repeated.

The rearward portion of the secondary support J slopes upwardly and rearwardly as may be seen in FIG. 1. First arms 16 and primary support B slope upwardly and forwardly as previously mentioned. Due to this structure, and the inward tapering relationship of the side pieces C, the forward portion of one of the shopping carts A may be nested within the rearward portion of one of the carts disposed forwardly thereof.

The use and operation of the shopping cart A has previously been explained in detail and need not be repeated.

I claim:

1. A shopping cart capable of being shipped in a dismantled condition, and said cart when assembled being easily repairable by substituting a new part for a part of said cart that has been damaged, which cart includes:
   a. an elongate, trapezoidal-shaped, flat, primary support for merchandise, said support formed from plastic and having two sets of laterally spaced flanges depending from the sides thereof;
   b. two laterally spaced rigid plastic sidepieces that include first elongate arms that extend forwardly and upwardly at an angle and snugly engage the spaces between said sets of flanges, with each of said sidepieces further including an upwardly extending member and a first downwardly extending member at the rear of said first arm, a second elongate arm disposed a substantial distance below said first arm and connected to said first downwardly extending member, and a second downwardly extending member disposed forwardly of said first member and connected to said first and second arms;
   c. first means for removably holding said first arms in said spaces between said flanges;
   d. second means removably secured to said second arms for holding said second arms in a predetermined lateral spacing;
   e. a secondary grocery support secured to said second means, with the rearward portion of said secondary grocery support sloping downwardly and forwardly;
   f. a transverse handle disposed between said upwardly extending arms and removably secured thereto;
   g. a downwardly extending gate assembly removably and pivotally secured to said upwardly extending arms and situated therebetween, with rearward pivotal movement of said gate being limited by the lower end of said gate contacting said primary grocery support when said gate is substantially parallel to said upwardly extending arms;
   h. a forward wall and two sidewalls defining means extending upwardly from said primary grocery support and removably secured thereto and to said gate assembly, said forward wall, sidewalls, gate and primary grocery support defining an enclosure in which groceries may be removably disposed;
   i. a plurality of casters secured to the forward and rearward ends of said second arms and extending downwardly therefrom to movably support said grocery cart on a floor surface, with said grocery carts nestling one within the other when the forward portion of one cart is removably positioned within the rearward portion of a second cart.

2. A shopping cart as defined in claim 1 in which said first means are screws that engage said flanges and said first arms.

3. A shopping cart as defined in claim 1 in which said second means are a plurality of longitudinally spaced, transverse rigid rods that extend between said second arms.

4. A shopping cart as defined in claim 3 in which said secondary support is a length of mesh material that extends longitudinally between said second arms and is secured to said rods.